United States Patent [19]

Bagatto et al.

[11] Patent Number: 4,830,507
[45] Date of Patent: May 16, 1989

[54] METHOD OF AND APPARATUS FOR THICKENING RED MUDS DERIVED FROM BAUXITE AND SIMILAR SLURRIES

[75] Inventors: Peter F. Bagatto; Donald L. Puxley, both of Jonquiere, Canada

[73] Assignee: Alcan International Limited, Montreal, Canada

[21] Appl. No.: 17,896

[22] Filed: Feb. 24, 1987

[30] Foreign Application Priority Data

Feb. 28, 1986 [CA] Canada .................... 502948

[51] Int. Cl.$^4$ .................. B01F 7/16; B01F 15/02; B01D 21/01; C02F 1/52
[52] U.S. Cl. .................. 366/132; 366/136; 366/142; 366/195; 366/279; 366/312; 366/325; 366/349; 210/96.1; 210/219; 210/738
[58] Field of Search .............. 366/325, 326, 279, 241, 366/64, 65, 67, 309, 312, 136, 137, 142, 131, 132, 135, 2, 194, 195, 196, 349; 210/738, 96.1, 219

[56] References Cited

U.S. PATENT DOCUMENTS

| | | | |
|---|---|---|---|
| 2,268,475 | 12/1941 | Darby | 366/312 |
| 2,322,719 | 6/1943 | Scott | 366/312 |
| 2,365,293 | 12/1944 | Robinson | 366/136 |
| 2,413,375 | 12/1946 | Pomeroy | 366/182 |
| 3,212,672 | 10/1965 | Kromhout et al. | 366/196 |
| 3,414,384 | 12/1968 | Goerg | 210/738 |
| 3,544,081 | 12/1970 | Eckhardt | 366/326 |
| 3,650,950 | 3/1972 | White | 210/219 |
| 4,040,954 | 8/1977 | Chandler | 210/709 |
| 4,226,714 | 10/1980 | Firness et al. | 210/738 |
| 4,250,032 | 2/1981 | Costa | 210/765 |
| 4,290,898 | 9/1981 | Von Hagel et al. | 210/738 |
| 4,302,328 | 11/1981 | Van Note | 210/738 |
| 4,328,094 | 5/1982 | Peck | 210/715 |
| 4,397,561 | 8/1983 | Strong et al. | 366/132 |
| 4,603,000 | 7/1986 | Casey | 210/738 |

FOREIGN PATENT DOCUMENTS

2624506 12/1977 Fed. Rep. of Germany ...... 210/219

*Primary Examiner*—Harvey C. Hornsby
*Assistant Examiner*—Joseph S. Machuga
*Attorney, Agent, or Firm*—Cooper & Dunham

[57] ABSTRACT

A method of and apparatus for the thickening of mud-like slurries produced during the course of industrial processes, e.g. the thickening of red muds produced during operation of the Bayer process for the production of alumina. The invention involves the step of feeding the slurry, a fluocculating agent and washing liquor to a deep thickening vessel having an underflow outlet for the thickened slurry and an overflow outlet for clarified washing liquor. The solids content of the slurry leaving the underflow outlet is increased and kept constant by the use of a stirrer having a number of generally vertical rod-like members rotated in the vessel above the underflow outlet. The stirrer enhances dewatering of the slurry and prevents undue build up of thick inactive mud which may block the outlet or cause fluctuations in the solids content of the thickened slurry.

44 Claims, 4 Drawing Sheets

METHOD OF AND APPARATUS FOR THICKENING RED MUDS DERIVED FROM BAUXITE AND SIMILAR SLURRIES

BACKGROUND OF THE INVENTION

1. Field of the Invention

This invention relates to the thickening of muds having clay-sized particles and yield pseudo-plastic properties produced by industrial processes and, more particularly, although not exclusively, to the thickening of red muds produced during the production of alumina from bauxite.

2. Discussion of the Prior Art

The most economical way of obtaining alumina from bauxite ore involves the Bayer process. This utilizes the reactions of solid aluminum hydroxide ($Al(OH)_3$) and aluminum oxide trihydrate and monohydrate ($Al_2O_3.3H_2O$ and $Al_2O_3.H_2O$) with aqueous caustic soda to form soluble sodium aluminate. The soluble compound is separated from insoluble impurities, precipitated as alumina trihydrate and calcined to form commercial grades of alumina.

The insoluble impurities of the ore remaining after the caustic soda treatment are known as "red muds" and these are thoroughly washed to remove soluble products before being discarded. The washing is normally carried out in a counter-current manner in several stages. Each stage involves mixing the mud slurry underflow from an earlier stage with the clarified overflow from a later stage. After each washing step, a flocculant is added to the mixture and the resulting mud flocs are allowed to settle and thicken in a clarifier/thickener vessel. The thickened mud is drawn off from the bottom of the vessel and passed to the next stage and the clarified overflow is injected as wash liquor in the previous stage. The washing normally takes place in a feedwell or feed pipe before the mixture is discharged into the thickener/clarifier. It is usual to stack several shallow thickener/clarifier vessels in a vertical manner to save space and operating costs. Nevertheless, the capital costs and space requirements of such a washing and thickening procedure are substantial because of the large surface area requirements of such thickener/clarifier vessels. One way of reducing such capital costs would be to enhance the ability of each thickener/clarifier to thicken the mud because the efficiency of the washing procedure is increased as the solids content of the mud from each stage is increased. The mud removed as underflow from a conventional thickener/clarifier has a solids content of 15 to 30%. The use of synthetic flocculants instead of the traditional starch has recently improved this figure to 17–33%, but this improvement is not sufficient to alter significantly the economics of the washing procedure.

The use of deep thickeners (as discussed by Dr. J. L. Chandler in an article entitled "Development of the Deep Thickener" produced by the Technical Development Department of Alcan Jamaica Company in January 1980) instead of conventional shallow thickener/clarifiers of large surface area improves the thickening effect, but a deposit of inactive (i.e. thick and immobile) mud builds up at the periphery of the vessel. This build up of inactive mud is undesirable because it reduces the active volume of the vessel available for settling and thickening and because the inactive mud tends to slump downwards periodically and block the mud outlet, or it may build up towards the level of the liquid surface, thus impairing the clarity of the overflow. Attempts to use conventional raking mechanisms to clear the entire inner volume of the vessel to prevent inactive mud build up have proven costly and impractical in view of the high torque requirements of the conventional mechanisms when used in this way.

Moreover, while deep thickeners are capable of increasing the solids content of the mud outflow, the natural thickening rate of the mud flocs is fairly slow and improvements could be obtained if this rate could be increased.

SUMMARY OF THE INVENTION

An object of the present invention is to provide a method of and apparatus for overcoming the above disadvantages of deep thickener vessels while maximizing their ability to thicken the muds.

According to one aspect of the invention there is provided a method of thickening a slurry of red mud derived from bauxite ore or other yield pseudo-plastic mud-like slurry having clay-sized particles, comprising: mixing said slurry with washing liquor and a flocculating agent; passing the mixture into a deep thickener vessel having at least one underflow outlet at the bottom for removal of thickened slurry and at least one overflow outlet at or adjacent to the top for removal of clarified liquor; and stirring said slurry above said at least one underflow outlet with a stirrer comprising substantially vertical rod-like members to enhance dewatering of the slurry.

According to another aspect of the invention there is provided apparatus for thickening a slurry of red mud derived from bauxite ore or other yield pseudo-plastic mud-like slurry having clay-sized particles, which comprises: a deep thickener vessel having at least one underflow outlet at the bottom for removal of thickened slurry and at least one overflow outlet at or near the top for removal of a clarified liquor; means for introducing a mixture of said slurry, washing liquor and a flocculating agent into the vessel at the top; and a stirrer comprising substantially vertical rod-like members located above said at least one underflow outlet for enhancing the dewatering of the slurry.

Some of the terms used in this description require explanation, as follows.

The term "rod-like member" is intended to mean a member which is narrow and elongated. The member may have a circular cross-section but this is not essential. However, if the cross-section is non-circular, the member should usually not be plate-like, i.e., considerably larger in width than in thickness. The important consideration is that the member should be capable of moving through a mud-like slurry in a direction at right angles to its long axis without causing significant movements of the slurry body or currents within the slurry body. The member may be stiff but can be flexible if supported at both ends.

By "inactive mud" we mean a slurry that has achieved a high solids content such that it no longer readily flows in a fluid manner. Such mud has pseudo-plastic yield properties and is not readily pumpable.

By "active mud" we mean a slurry which is capable of flowing in a fluid manner.

By the "profile" of inactive mud we mean the shape at the edge of a layer of such mud when the layer is viewed in vertical cross section. The profile is determined by the angle of repose of the mud. The profile of a mud layer laid down in the absence of stirring or raking is referred to as the "natural profile". It should be appreciated that when a thickener is being operated the profile may vary to some extent with time and it may not be a fixed line but rather a band over which the solids concentration rapidly varies.

By the term "deep thickener" we mean a thickener vessel having a sufficient depth that the thickening of the slurry is substantially increased at the lower levels of the slurry body by virtue of the weight of slurry in the intermediate and upper levels. Generally this means that the ratio of the height above the underflow outlet of the interface between the slurry layer and an overlying layer of clarified liquor to the diameter of the vessel is approximately at least 0.5 to 1.

By using a stirrer comprising substantially vertical rod-like members in a deep thickener vessel it is possible not only to improve the degree of thickening which takes place but also to maintain a large active volume within the vessel and generally t prevent blockage of the underflow outlet. Moreover, these benefits can be obtained without the stirrer having a high torque demand since the rod-like members move easily through the slurry.

The substantially vertical rod-like members enable dewatering of the slurry to take place rapidly because they create vertical channels in the flocculated solids through which the water may pass freely towards the surface. Furthermore, by using the stirrer to prevent the inactive mud from adopting its natural profile and position in the vessel, the problems of slumping and undue inactive mud build up can be avoided.

It is not necessary to stir the entire volume of the slurry within the vessel. The solids content of the slurry increases as the bottom of the vessel is approached, so dewatering of the slurry (i.e. the thickening of the slurry flocs by expulsion of water therebetween) becomes progressively more difficult towards the bottom of the vessel. A substantial improvement in the dewatering effect can thus be achieved if only the bottom slurry layers (e.g. the bottom third of the slurry volume) is stirred with the substantially vertical rod-like members. However, stirring at any vertical level improves the dewatering effect to some extent and the stirrer may operate over the entire vertical height of the slurry body, if desired.

In the horizontal direction, the stirrer may extend from the centre of the vessel to the peripheral wall at all vertical levels, but this is not preferred. It is much better to shape the stirrer in such a manner that its rotational profile (i.e. its maximum outline when viewed horizontally) decreases in width from top to bottom. That is, at the top (near the slurry/clarified liquor interface) the stirrer may extend to (or near to) the vessel wall, and at the bottom (above the underflow outlet), the stirrer may only project horizontally by a short distance beyond its central axis.

Advantageously, the rotational profile of the stirrer is generally triangular (decreasing in width from top to bottom) with a straight or concave side edge. That is, if a straight line is visualized between the periphery of the rotational profile at the top and the periphery of the rotational profile at the bottom, no intermediate part of the profile should extend horizontally beyond this line. If the side edge of the rotational profile is convex, it is found that the torque demand of the stirrer significantly increases whereas there is little or no further increase in the volume of active mud or further decrease in the risk of slumping, etc.

It is even more advantageous if the rotational profile is made to correspond approximately in shape to the natural profile of the inactive mud layer, while being positioned closer to the vessel wall than the natural profile. The inactive mud, when deposited in the absence of stirring, generally adopts the shape of an inverted bell curve. That is, the intermediate parts of the profile slope inwardly in an approximately straight line, but the top flares outwardly and the bottom curves inwardly. When the rotational profile of the stirrer is given a similar shape, it projects into the inactive mud layer to the same extent at each vertical level, so the torque demands of the stirrer at each level are the same and the overall torque demand is minimized. In actuality, since the inactive mud becomes more compact towards the bottom, an equal torque distribution will only be obtained if the bottom parts of the stirrer project less deeply into the inactive mud than the top parts. This can be achieved by making the slope of the central part of the rotational profile slightly less than (e.g. up to 10° and preferably up to 5° less than)the slope of the central part of the natural profile. Thus, for example, if the slope of the natural profile varies from 60° to 70°, the slope of the rotational profile can be set at 60°.

It should be appreciated that when speaking of the stirrer projecting into the inactive mud body this may not in fact be the case in practice. If the stirrer is operated before the inactive mud layer builds up, the stirrer may never project significantly into the inactive mud because it prevents the inactive mud from building up beyond the rotational profile of the stirrer. What we really mean in such a case is that the stirrer projects into the volume between the actual profile of the inactive mud and its natural profile, i.e. its shape and location adopted in the absence of stirring.

The width and positioning of the stirrer at the bottom are important to some extent. If the width is increased, the active volume of the mud will be increased and the inactive mud will be less likely to build up to the outlet for clarified liquor. However, the torque demand increases as the width increases, so a width must be chosen which gives suitable advantages without undue torque. The bottom of he stirrer is usually located above the underflow outlet in the vessel bottom. The separation between the vessel bottom and the stirrer should be selected so that inactive mud cannot build up sufficiently to reach the outlet. This depends to some extent on the width of the stirrer at the bottom and the angle of repose of the mud.

The stirrer may be rotated quite slowly because adequate dewatering takes place at low speeds and the torque demand increases as the speed is increased. At really fast speeds of rotation, the body of the slurry may be caused to rotate in the thickener vessel. This is undesirable because the thickening effect is then reduced. The optimum speed depends to some extent on the diameter of the vessel, the number of rod-like members, etc. but generally it can be stated that none of the rod-like members of a stirrer should exceed a rotational speed of about 15 to 20 feet per minute. This corresponds to one rotation every eight minutes for a thickener of the usual size.

The rod-like members may be supported by arms extending horizontally from a central vertical rotatable shaft. The arms may be provided at two or more vertical levels and there may be two or more (e.g. 2, 3 or 4)

arms at each level. When more arms are provided, slower rotational speeds may be employed and an improved dewatering effect can be achieved, but the torque demand increases as the number of arms and rod-like members increase. Most preferably, two arms are provided at each of three levels and 3 to 10 rod-like members are connected to each arm.

The rod-like members are made substantially vertical to provide vertical channels for dewatering, but the rods may be angled from the vertical to a small extent, if desired. For example, the rods may be angled radially outwardly or in the direction of rotation by up to about 45°, preferably by up to 30°.

While the thickener vessel is normally provided with one central underflow outlet for the thickened mud, more than one outlet may be provided, for example to reduce the possibility of blockage. When there is more than one outlet, they should preferably be grouped around the centre of the bottom wall and the bottom of the stirrer should be large enough to maintain all of the outlets free of inactive mud.

The invention is capable of producing thickened slurries having a solids content much higher (e.g. at least 50% higher) than those achievable with conventional shallow thickening vessels. Depending on the type of mud-like slurry, the achievable solids content may fall within the range of at least 30 to 50% by weight.

DETAILED DESCRIPTION OF THE PREFERRED EMBODIMENTS

Figure 1:
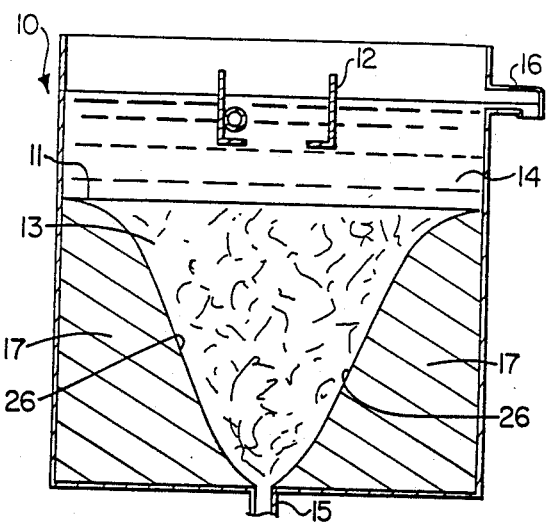
FIG. 1 is a cross-section of a thickener vessel which is not provided with a stirrer and thus shows the natural profile of the body of inactive mud.

FIG. 1 shows a vertical cross-section of a deep thickener 10 operated without a stirrer.

When mud slurry, washing liquor and flocculant are introduced into the thickener 10 through a feed well 12, the mud flocs settle to form an active mud volume 13 and clarified washing liquor 14 separated by a mud/liquor interface 11. The thickened mud is withdrawn fro an underflow outlet 15 and the clarified washing liquor overflows at an outlet 16. Gradually a body 17 of inactive (i.e. thick and relatively immobile) mud builds up around the periphery of the thickener vessel and extends (when viewed in vertical cross-section) in an inverted bell curve from the underflow outlet 15 upwards and outwards to the peripheral all of the thickener at the interface 11. The profile of the inactive mud layer is determined by the angle of repose of the mud and will vary to some extent according to the type of mud and other conditions.

A problem with this type of thickener is, as noted above, that the thick inactive mud may slump towards the outlet 15 from time to time and may thus restrict or even block the outlet. Moreover, the upper ends of the body 17 of inactive mud may extend beyond the mud-liquor interface 11 and reduce the clarity of the liquor exiting the outlet 16. This arrangement also encourages "rat-holing", i.e. the tendency of the active mud 13 to compress and thicken excessively except for narrow vertical channels which receive most of the liquid throughput. Rat-holing causes the solids content of the mud flowing from outflow 15 to decline dramatically. An uncontrolled build up of inactive mud furthermore reduces the residence time of the active mud in the thickener and consequently lowers the percentage solids at the outlet.

Figure 2:
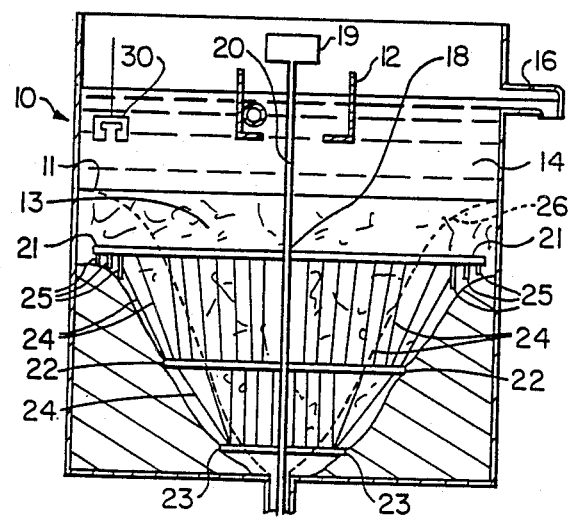
FIG. 2 is a cross-section similar to FIG. 1 showing a thickener vessel provided with a stirrer.

A preferred apparatus according to the invention is shown in FIG. 2. The thickener vessel 10 is basically the same as the vessel of FIG. 1 and identical parts are identified by the same reference numerals. The apparatus of FIG. 2 has a stirrer 18 operated by a motor 19. The stirrer consists of a central vertical rod 20 having a number of radially-extending arms 21, 22 and 23 rigidly attached thereto. The arms are provided at three horizontal levels with arms 21 being uppermost, arms 22 being intermediate and arms 23 being lowermost. At each vertical level, there are preferably at least two and possibly three or four such arms.

Vertical, or substantially vertical, rod-like elements 24 (which may be cables, rods, wires or the like) extend between the arms. The rod-like elements act as stirring and dewatering means and the arms 21, 22 and 23 principally act as supports for the rod-like elements but inevitably do themselves provide some stirring.

Upon rotation of the stirrer 18, the rod-like elements 24 have three effects. Firstly, by creating disturbances in their wake, they form channels in the flocculated solids (active mud) which allow egress of water to the surface. Secondly, in consequence of the rotational profile of the stirrer as shown in FIG. 2, the outermost rod-like elements prevent the volume of inactive mud from increasing to assume the natural profile 26 and position as shown in FIG. 1 (and in broken lines in FIG. 2) by continuously preventing the deposition of new inactive mud on the outermost inactive mud surface, and also prevent the mud from slumping to the outlet. Thirdly, the constant stirring of the active mud maintains its fluidity and prevents rat-holing.

Figure 3:
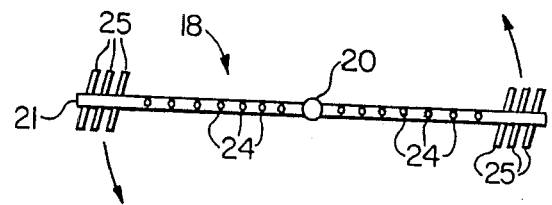
FIG. 3 is a top plan view of the stirrer shown in FIG. 2.

As well as being provided with the rod-like elements 24, the upper arms 21 are provided at their outermost ends with plate-like paddles 25 (shown more clearly in FIG. 3) extending downwardly and inclined relative to the direction of rotation to deflect inactive mud located adjacent to the vessel periphery towards the centre of rotation. The paddles are provided to positively ensure that the inactive mud level does not rise above the arm 21 and thus jeopardise the clarity of the liquor 14.

By comparing FIGS. 1 and 2 it will be seen that the rotational profile of the stirrer 18 (i.e. its radially outermost periphery as shown in FIG. 2) is similar to the natural profile 26 of the inactive mud 17, but it is located closer to the vessel wall and is inclined less steeply. This rotational profile is achieved by making uppermost arms 21 quite long, by making intermediate arms 22 shorter and by making lowermost arms 23 quite short. Moreover, while most of the rod-like members 24 are vertical, the outermost ones are sloping as shown.

Between the arms 21, 22 an 23, the mud body 17 adopts a sloping profile which is again dictated by the angle of repose of the mud.

The result of the above arrangement is that the torque demand of the stirrer is kept to a minimum while the active mud volume 13 in the thickener is kept high, slumping of the inactive mud layer is prevented and the solids in the active mud compress and thicken uniformly as they move from the mud liquor interface 11 to the underflow outlet 15. The solids content of the mud exiting the outlet 15 remains fairly constant and high and there is little tendency for the outlet to become blocked.

If the apparatus has to be shut down temporarily for any reason, the rotation of the stirrer 18 prevents the central volume of active mud from settling and thickening unduly and keeps the outlet 15 free of large solid particles.

To maintain low cost, the rod-like elements 24 may be of circular cross-section. However, any cross-sectional shape can be employed which preferably tends to cause the slurry to flow smoothly around the forward part of the element but creates turbulence at the rearward part. For example, the rods may be bullet-shaped or triangular (with the apex foremost) in cross-section.

While the device shown has arms 21, 22 and 23 at three different vertical levels, the nature of the stirrer may be changed according to the height to diameter ratio of the vessel and the available torque of the motor 19 etc. The minimum number of arms is generally two in order to provide the required support for the elements 24. However, the greater the number of arms, the better the rotational profile of the stirrer can be made to fit the natural profile, but the larger are the torque requirements.

If the vessel shown in FIG. 2 has a diameter of forty feet and a height of 35 feet, preferably two to four lowermost arms are provided 3 to 6 feet above the outlet 15. These arms preferably extend 2 to 6 feet beyond the natural profile 26. There are preferably 2 to 4 uppermost arms 21 extending within 1 to 2 feet of the vessel wall to project 2 to 6 feet past the profile 26 at their level. The uppermost arms are preferably located 4 to 10 feet below the mud-liquor interface 11. There are preferably 2 to 4 intermediate arms 22 located approximately mid way between the bottom and the top arms. These arms project 2 to 4 feet beyond the natural profile 26.

The number of elements 24 is not limited. Normally there are 3 to 10 elements per arm depending on the length of the arm. The elements are secured by any suitable means such as by drilling holes in the arms and securing the end of the elements in the holes.

In order to achieve the maximum thickening effect, the mud/liquor interface 11 should be kept as high in the vessel as possible without unduly increasing the solids content of the clarified overflow from the outlet 16. The thickening effect takes place, at least partially, as a result of the compression of the mud flocs towards the bottom of the apparatus due to the weight of mud layers thereabove. Thus, the greatest compression is achieved when the interface 11 is at its maximum height. In order to keep the interface at the required level it is necessary to provide means for detecting the position of the interface and means actuated by the detector means for controlling the interface level.

The means for detecting the level of the interface can be of any suitable form, but it should preferably be able to function even when the interface is ill-defined. Normally, the mud-liquor interface is well defined and horizontal across the vessel. In the case of bauxite red mud, the solids content of the solution changes at the interface from nearly clear liquor to 20% or more in a matter of inches, but with other slurries or in adverse conditions, the interface may not be so well defined. The detector means found to be the most reliable is a vertically movable ultrasonic probe which locates the interface by sensing the density of the slurry between its transmission and receiving faces. A detector of this type is indicated by the reference numeral 30 in FIG. 2.

The position of the interface 11 can be controlled by varying the amount of slurry passing through the outlet 15. By increasing the rate of flow, the level of the interface 11 can be caused to fall and, conversely, by decreasing the rate of flow the level can be caused to rise (assuming that the rates of introduction of the slurry, wash liquor and flocculant into the vessel are held constant). Preferably, means are provided which automatically adjust the rate of flow through the outlet 15 in accordance with the signals received from the detector 30.

Figure 4:
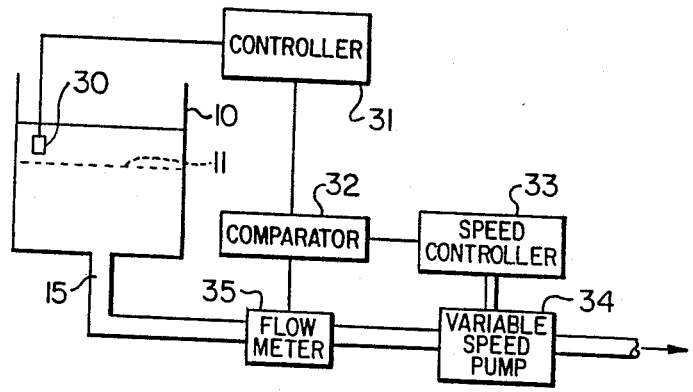
FIGS. 4 is a schematic view of a system for controlling the level of a mud/liquor interface in the thickener.

To achieve good operation it has been found that a cascade type control loop is required to maintain a fixed or manually-set interface level. Such a control loop is indicated schematically in FIG. 4. The detector 30 transmits a signal to a controller 31 indicating the position of the interface 11. The controller 31 compares the signal o that corresponding to a desired level. If a difference in signals is detected, the controller 31 sends a signal to a further comparator 32 which compares it with a signal from a flow meter 35. The comparator 32 sends a signal to a speed controller 33 of a variable speed pump 34 until the signal from the flow meter matches the signal from comparator 31.

This "cascade" control has been found to be the most effective method of controlling the interface and detecting underflow blockages quickly. Calibration of the flowmeter 35 is not important in the operation of this loop.

As an alternative, the variable speed pump 34 can be controlled directly by signals from the detector, but it has been found that smooth response is often difficult to achieve and wide fluctuations may be caused in the underflow rate through outlet 15 which can cause large fluctuations in the percentage solids of the thickened slurry.

Another factor which has proved to be of importance in the operation of such thickeners, at least for bauxite red muds, is the percentage solids content of the slurry introduced into the thickener. This solids content is, for bauxite mud, conventionally 10 to 15% by weight because this is the percentage range obtained by mixing the mud underflow from a previous stage with the clarified liquor from a later stage. Although it might be expected that an increased solids output could be obtained by increasing the solids input, we have determined that the thickening operation can be made more efficient by reducing the solids content of the input slurry to within the range of 2 to 8% by weight and, more preferably 2 to 4% by weight. Within this range, the mud slurry flocculates and settles much more efficiently than at higher solids contents.

To reduce the solids content of the input slurry, clarified liquor 14 exiting the thickener 10 (e.g. via the outlet 16) can be recirculated by a pump to the slurry input pipe in order to dilute the slurry. A suitable arrangement is shown in FIG. 5.

Figure 5:
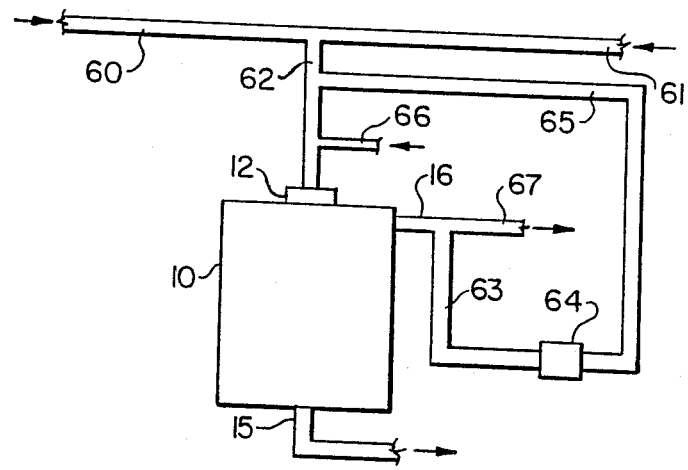
FIG. 5 is a schematic view of a system for recirculating clarified overflow to the slurry input.

FIG. 5 shows a pipe 60 for carrying thickened mud from a previous stage and a pipe 61 for carrying clarified liquor from a later stage. The mud and the liquor meet and mix at the point where pipes 60 and 61 join together and consequently washing takes place at this point. The resulting slurry mixture then enters pipe 62 which conveys it to the feed well 12 of the thickener 10. Before the slurry enters the feed well, however, it is mixed with additional clarified liquor taken from the thickener 10 via outlet 16, pipe 63, pump 64 and pipe 65 which joins pipe 62. A flocculant is also mixed with the slurry (after the dilution step) via pipe 66. Preferably, the pipe 62 has a constriction (not shown) downstream of the pipe 66 to slow the slurry flow and to allow the flocculation to take place in a reasonably placid zone.

Only a small amount of clarified liquor is recirculated in this way and most passes directly to the next stage via the extension 67 of outlet 16.

Although, as stated above, the clarified liquor for recirculation can be taken from the feed through the outlet 16, the liquor may be taken directly from the thickener by an alternative outlet if desired, e.g. if it is considered important not to disturb the feed through the outlet 16.

The feed well 12 is designed to allow the flocculated slurry to be introduced gently into the thickener, i.e. it eliminates currents which may stir up the settling solids. The feedwell is merely a cylindrical vessel having a central lower opening located below the slurry surface. The slurry feed is fed into the feed well in a tangential manner adjacent to its inner wall so that currents flow horizontally around the feed well rather than vertically through the central hole.

Figure 6:
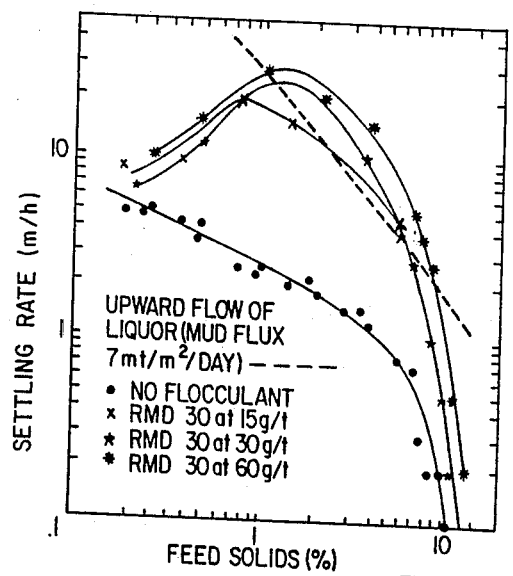
FIGS. 6 and 7 are graphs showing the effects of the percentage solids in the feed to the vessel on the settling rates of the slurry.
Figure 7:
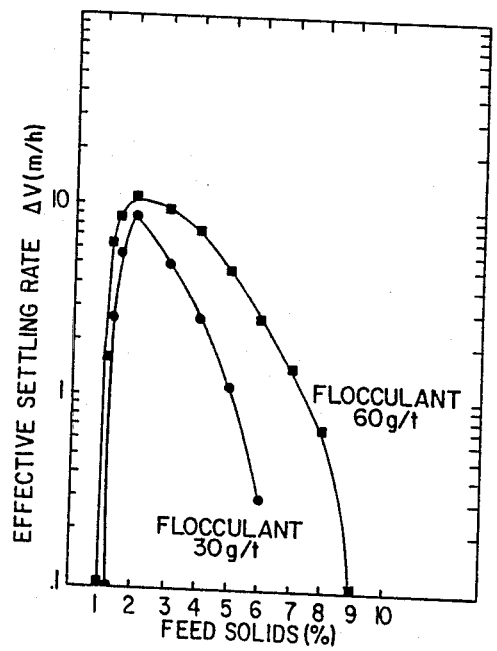

FIGS. 6 and 7 are graphs showing that the range of solids of 2 to 8 percent for the input slurry is the most desirable for Vaudreuil red muds. FIG. 6 shows the settling rate versus the feeds solid percent (on a logarithmic scale). When a flocculant is employed it can be seen that the settling rate increases when the solids content is between about 0.2 and 8 percent. The graph also shows (as a broken line) the upward flow of liquor. It is only when the settling rate is to the right of this line that positive settling takes place to give an effective settling rate. This effective settling rate is shown in FIG. 7 and it can be seen that solids contents between 2 and 8 percent, and preferably 2 to 4%, give good effective settling rates.

The nature of the flocculant employed also affects the performance of the thickener.

The objective of flocculation is to produce large dense flocs of mud which will settle quickly and dewater readily once settled. Polyacrylamide sodium-polyacrylate based flocculants provide good settling, compaction and clarity, but these results depend to some extent on anionicity, molecular weight, flocculant preparation, mixing with mud, concentration of the mud and conditioning time for floc growth.

With regard to anionicity and molecular weight, over the range of soda values found in mud wash circuits, it is found that more than one flocculant should be employed to maximize the percent solids by weight in the underflow, especially when the soda concentration drops below about 30 to 40 gpl total soda (as $Na_2CO_3$). It is found that different flocculants are effective over different ranges of total titratable soda (T.T.S.).

Figure 8:
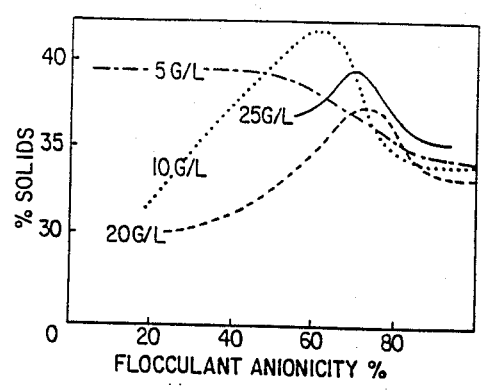
FIGS. 8, 9 and 10 are graphs showing the results of settling tests carried out using flocculants under various conditions.
Figure 9:
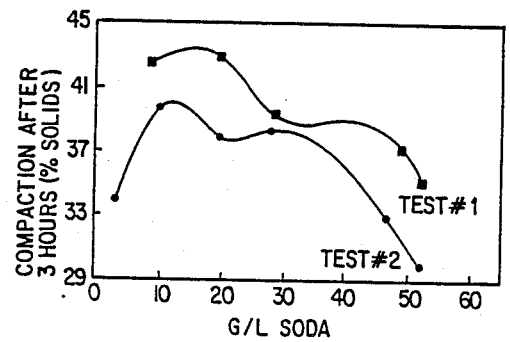
Figure 10:
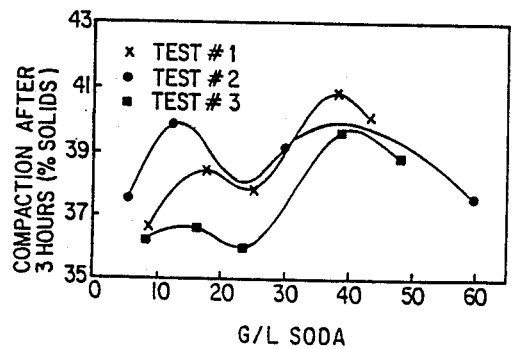

FIGS. 8, 9 and 10 illustrate the results of laboratory tests employing various flocculants in a pilot thickener using bauxite red mud. The narrow range of soda values over which some flocculants are efficient should be noted.

FIG. 8 shows the compaction percentage solids versus the flocculant anionicity of polyacrylamide sodium polyacrylate flocculants at various concentrations of total titratable soda. It can be seen that over these ranges of total titratable soda, the flocculant anionicity should preferably be in the range of 40 to 90%, preferably 60 to 80%.

FIG. 9 shows the compaction percentage solids versus the concentration of total titratable soda using a flocculant sold under the trade mark PRAESTOL 2237 (60% anionicity). This indicates that the flocculant is effective in the range of up to 50 gpl T.T.S.

FIG. 10 shows the compaction (percentage solids) versus concentration of T.T.S. employing a flocculant sold under the trade mark ALCLAR WG-23 (77% anionicity). This indicates that the flocculant is effective in the range of 10 to 60 gpl T.T.S.

The mixing of the flocculant solution with the mud slurry should be done very quickly and thoroughly after which a relatively short conditioning time appears to be required for the flocs to form to their maximum diameter under gentle agitation. The degree of agitation should be such as not to prevent their full growth nor harsh enough to break down the fragile flocs before they reach the feed well. Preferably, additional flocculant is added at the feed well to offset the breakdown that occurs in the feed piping following the initial formation of the flocs after mixing.

It has been found that the conventional multi-level shallow thickener/clarifiers commonly used for mud washing circuits can easily be converted into deep thickeners embodying the present invention. This can be done by removing the horizontal dividers to form a deep vessel and modifying the conventional rakes (which are normally connected to a single central vertical rod) to form a stirrer as described above.

Although the invention has been described in detail with particular reference to the thickening of red muds produced during the Bayer process, the invention can also be applied to many mud-like slurries having clay-sized particles and yield pseudo-plastic properties produced in the course of industrial processes (e.g. muds produced during phosphate mining and treatment), provided such muds are capable of undergoing flocculation. Variations may be required in certain details, e.g. the percentages of solids in the feed stream, the amounts of flocculants, etc., but it is believed that these variations can readily be determined by trial and simple experimentation.

It will be apparent to persons skilled in the art that variations and modifications can be made to the embodiments described above. All such variations and modifications form part of this invention to the extent they fall within the scope of the following claims.

We claim:

1. A method of thickening a slurry of red mud derived from bauxite ore or other pseudoplastic mud-like slurry having clay-sized particles, comprising:
    mixing said slurry with washing liquor and a flocculating agent;
    passing the mixture into a deep thickener vessel having a substantially cylindrical side wall, at least one underflow outlet at the bottom for removal of thickened slurry and at least one overflow outlet at or adjacent to the top for removal of clarified liquor;

stirring said slurry above said at least one underflow outlet with a stirrer having a rotational profile that decreases in width from top to bottom and which comprises substantially vertical rod-like members to enhance dewatering of the slurry;

allowing a body of thick inactive slurry to build up around said cylindrical side wall; and operating said stirrer to maintain a central volume of fluid active slurry in communication with said at least one underflow outlet while causing the stirrer to contact a surface of said body of inactive slurry to cause said body to resist slumping of the inactive mud into said at 2. A method according to claim 1 which comprises employing said stirrer to cause said inactive slurry body to adopt a vertical profile located closer to the periphery of the vessel than would be the case if the thickener were operated in the absence of any stirrer.

3. A method according to claim 1 which comprises employing said stirrer to cause said inactive slurry body to adopt a vertical profile which differs in shape from the profile the body would adopt if the thickener were operated in the absence of any stirrer.

4. A method according to claim 3 wherein said stirrer is employed to give said inactive slurry body a non-concave profile.

5. A method according to claim 3 wherein said stirrer is employed to give said inactive slurry body a profile which is similar in shape to, but displaced outwardly towards the vessel periphery from, the profile the body would adopt if the thickener were operated in the absence of any stirrer.

6. A method according to claim 3 wherein said stirrer is employed to give said inactive slurry body a profile which is similar in shape to the profile the body would adopt if the thickener were operated in the absence of any stirrer, but which slopes, at least in its central part, by a smaller angle to the horizontal.

7. A method according to claim 6 wherein said angle of slope is up to 10° smaller.

8. A method according to claim 1 which comprises operating slurry deflection means below the top of the thickener adjacent to the inner periphery to prevent said body of inactive slurry from building up above said deflection means.

9. A method according to claim 1 which comprises operating said stirrer at a speed fast enough to enhance dewatering of the slurry but slow enough to avoid causing said slurry to rotate within said vessel.

10. A method according to claim 9 wherein said speed is such that said substantially vertical rod-like members do not exceed a speed of 20 feet per minute.

11. A method according to claim 9 wherein said stirrer is rotated at about one revolution per eight minutes.

12. A method according to claim 1 wherein said mixing of said slurry, washing liquor and flocculating agent is carried out in such a manner that the mixture passed into the deep thickener has a solids content in the range of 2 to 8% by weight.

13. A method according to claim 1 wherein said mixing of said slurry, washing liquor and flocculating agent is carried out in such a manner that the mixture passed into the deep thickener has a solids content in the range of 2 to 4% by weight.

14. A method according to claim 13 wherein a portion of said washing liquor used for said mixing step is liquor taken from a clarified liquor layer which forms at the top of said vessel.

15. A method according to claim 1 wherein the mixture passed into said thickener vessel separates vertically into a lower slurry layer and an upper clarified liquor layer, said layers meeting at an interface, and wherein said interface is maintained at a predetermined vertical position within said vessel.

16. A method according to claim 15 wherein the interface is maintained at said predetermined vertical position by detecting the actual position of the interface and, when said actual position differs from said predetermined position, adjusting the rate of flow of slurry from said underflow outlet to cause said actual position to move to said predetermined position.

17. A method according to claim 16 wherein said rate of flow is adjusted by adjusting the speed of a slurry pump located in a pipe communicating with said at least one underflow outlet.

18. A method according to claim 1 wherein said mixture is passed into said thickener vessel by introducing it tangentially into a cylindrical feed well having a hole in a bottom thereof located a short distance below the surface of the slurry in the vessel.

19. Apparatus for thickening a slurry of red mud derived from bauxite ore or other pseudoplastic mud-like slurry having clay-sized particles, which comprises:

a deep thickener vessel having a substantially cylindrical side wall, at least one underflow outlet at the bottom for removal of thickened slurry and at least one overflow outlet at or near the top for removal of a clarified liquor;

means for introducing a mixture of said slurry, washing liquor and a flocculating agent into the vessel at the top; and a stirrer having a rotational profile that decreases in width from top to bottom and which comprises substantially vertical rod-like members located above said at least one underflow outlet for enhancing the dewatering of the slurry;

said stirrer being sized and positioned such that, upon rotation, the stirrer allows a body of thick inactive slurry to build up around said cylindrical wall while maintaining a central volume of fluid active slurry in communication with said at least one underflow outlet, and such that a surface of said body of inactive slurry is contacted by said stirrer to cause said body to resist slumping into said at least one underflow outlet.

20. Apparatus according to claim 20 wherein no part of the stirrer between the top and the bottom projects substantially beyond a straight line interconnecting the periphery of the rotational profile at the top and the periphery of the rotational profile at the bottom.

21. Apparatus according to claim 19 wherein the stirrer has a rotational profile similar to, but displaced closer to the periphery of the thickener vessel than, the profile which a body of inactive slurry would adopt if slurry were passed through said apparatus in the absence of said stirrer.

22. Apparatus according to claim 21 wherein said rotational profile slopes, at least at its central part, by a smaller angle to the horizontal than said profile of said inactive slurry body.

23. Apparatus according to claim 22 wherein said angle is up to 10° smaller.

24. Apparatus according to claim 19 wherein said stirrer comprises a central vertical shaft, a plurality of arms extending generally horizontally from said shaft at least two different vertical levels, and said substantially vertical rod-like members extending between said arms at said different vertical levels.

25. Apparatus according to claim 24 wherein 2 to 4 arms are provided at each vertical level.

26. Apparatus according to claim 24 wherein said arms are provided at three different vertical levels.

27. Apparatus according to claim 26 wherein said arms at the uppermost vertical level extend almost to the vessel periphery, said arms at the intermediate vertical level are shorter than said uppermost arms, and said arms at the lowermost vertical level are shorter than said intermediate arms.

28. Apparatus according to claim 27 wherein said rod-like members extend vertically between said arms at said different levels, except for the rod-like members at the ends of said arms which slope slightly from the vertical in view of the different lengths of the arms at the different levels.

29. Apparatus according to claim 24 wherein the arms at the uppermost vertical level are provided at their ends with angled plates which act as paddles to direct slurry towards the centre of rotation of the stirrer.

30. Apparatus according to claim 24 wherein 3 to 10 rod-like members are attached to each arm.

31. Apparatus according to claim 19 wherein the rotational profile of the stirrer at the bottom and the spacing of the stirrer from said underflow outlet are such that thick inactive slurry which may form in the thickener vessel cannot build up below the stirrer in the region of the underflow outlet.

32. Apparatus according to claim 19 wherein said rod-like members have a thickness of at least ½ inch.

33. Apparatus according to claim 19 wherein the ratio of the depth of an interface which forms in the vessel between thickening slurry and clarified liquor, to the diameter of the vessel is 0.5 or more to 1.

34. Apparatus according to claim 19 including a motor for rotating said stirrer, said motor being designed to rotate said stirrer at such a speed that none of the substantially vertical rod-like members exceed a speed of 20 feet per minute.

35. Apparatus according to claim 34 wherein said motor is designed to rotate said stirrer at a speed of about one revolution per eight minutes.

36. Apparatus according to claim 19 wherein said rod-like members have a transverse cross-sectional shape which allows slurry to flow smoothly therearound at the leading side when the stirrer is rotated but to create minor, turbulence at the trailing side.

37. Apparatus according to claim 36 wherein said transverse cross-sectional shape is selected from the group consisting of circular, bullet shaped and triangular.

38. Apparatus according to claim 19 which further comprises means for recirculating liquor from the top of the thickener vessel to the means for introducing the mixture into the vessel to supplement said washing liquor.

39. Apparatus according to claim 38 wherein said recirculation means is capable of recirculating sufficient liquor to reduce the solids content of the mixture to 2-8% by weight when the solids content prior to the introduction of the recirculated liquor is 10% by weight or more.

40. Apparatus according to claim 19 further comprising means for detecting the vertical position of an interface which forms in said vessel between a lower slurry layer and an upper clarified liquor layer, and means for varying said vertical position so that the interface can be maintained in a predetermined position.

41. Apparatus according to claim 40 wherein said means for detecting is an ultrasonic generator/receiver.

42. Apparatus according to claim 40 wherein said means for varying the vertical position comprises means for varying the rate of slurry flow through said at least one underflow outlet.

43. Apparatus according to claim 42 wherein said means for varying the rate of slurry flow comprises a variable speed pump located in a slurry pipe connected to said at least one underflow outlet.

44. Apparatus according to claim 43 wherein the means for detecting the interface position and the means for varying the rate of slurry flow are interconnected via a control circuit, said circuit comprising a signal generator for generating a signal proportional to the position of the interface, a comparator for comparing said signal with a signal corresponding to said predetermined interface position and generating a signal proportional to the difference therebetween, a flowmeter in said slurry pipe capable of generating a signal proportional to the slurry flow rate, a further comparator for comparing the signal from the flowmeter with the signal from the first comparator and means for varying the speed of said variable speed pump in accordance with the signal received from the further comparator.

* * * * *

UNITED STATES PATENT AND TRADEMARK OFFICE
CERTIFICATE OF CORRECTION

PATENT NO. : 4,830,507
DATED : May 16, 1989
INVENTOR(S) : Peter F. Bagatto and Donald L. Puxley It is certified that error appears in the above-identified patent and that said Letters Patent is hereby corrected as shown below:

Column 11, line 16, after "at" insert --least one underflow outlet.--

Signed and Sealed this

Twenty-first Day of April, 1992

Attest:

HARRY F. MANBECK, JR.

*Attesting Officer*  *Commissioner of Patents and Trademarks*